United States Patent
Sears et al.

(10) Patent No.: US 8,464,583 B2
(45) Date of Patent: Jun. 18, 2013

(54) ULTRASONIC LEVEL MEASUREMENT APPARATUS AND METHOD HAVING VARIABLE TRANSMIT POWER

(75) Inventors: Jeffery Allan Sears, Berkshire (GB); Luis Filipe Da Silva Ribeiro Coelho, Cantanhede (PT)

(73) Assignee: Mobrey Limited, Berkshire (GB)

( * ) Notice: Subject to any disclaimer, the term of this patent is extended or adjusted under 35 U.S.C. 154(b) by 522 days.

(21) Appl. No.: 12/531,121

(22) PCT Filed: Mar. 12, 2008

(86) PCT No.: PCT/US2008/003326
§ 371 (c)(1),
(2), (4) Date: Oct. 19, 2009

(87) PCT Pub. No.: WO2008/127529
PCT Pub. Date: Oct. 23, 2008

(65) Prior Publication Data
US 2010/0101320 A1    Apr. 29, 2010

(30) Foreign Application Priority Data
Mar. 17, 2007    (GB) .................................. 0705187.3

(51) Int. Cl.
*G01F 23/00*    (2006.01)
(52) U.S. Cl.
USPC ..................................................... 73/290 V
(58) Field of Classification Search
USPC ..................................................... 73/290 V
See application file for complete search history.

(56) References Cited

U.S. PATENT DOCUMENTS

| 4,000,650 A | 1/1977 | Snyder ............................ 73/290 |
| 4,221,004 A | 9/1980 | Combs et al. .................. 367/114 |
| 4,596,144 A | 6/1986 | Panton et al. .................. 743/620 |

FOREIGN PATENT DOCUMENTS

| GB | 2 230 608 A | 3/1989 |
| WO | WO 01/77625 A1 | 10/2001 |

OTHER PUBLICATIONS

Second Chinese Office Action (with English translation) for corresponding Chinese Patent Application No. 200880008626.X, dated Dec. 16, 2011, 14 pages.
Search Report and Written Opinion from corresponding PCT/US2008/003326, dated Jul. 31, 2008.
Office Action from related Chinese Application Serial No. 200880008626, dated Jul. 13, 2010.

*Primary Examiner* — David Rogers
*Assistant Examiner* — Alex Devito
(74) *Attorney, Agent, or Firm* — Westman, Champlin & Kelly, P.A.

(57) ABSTRACT

The invention provides a method for improving the accuracy of level measurement by reducing or eliminating receive circuit saturation in ultrasound level measurement apparatus. The method involves adjusting the transmit power in order to control echo amplitude, in particular to avoid saturation, when the surface being monitored is within a pre-defined distance from the ultrasound transducer. The particular advantage of the invention is that it may be implemented without change to the electronic circuitry embodied in the apparatus.

8 Claims, 5 Drawing Sheets

ULTRASONIC LEVEL MEASUREMENT APPARATUS AND METHOD HAVING VARIABLE TRANSMIT POWER

This Application is a Section 371 National Stage Application of International Application No. PCT/US2008/003326, filed Mar. 12, 2008, published in English, the content of which is hereby incorporated by reference in its entirety.

FIELD OF THE INVENTION

This invention relates to level measurement and is applicable, in particular, to level measurement using ultrasonic reflection.

BACKGROUND

The use of ultrasound to measure the level of contents in tanks and spillways has been known for a considerable period of time, two examples of this type of apparatus being described and claimed in U.S. Pat. No. 4,596,144 (Federal Industries) and UK patent 2,230,608 (Hycontrol).

The basic principles for using ultrasound to measure the depth of tank contents are well known. A pulse of ultrasound is transmitted, from a transmit/receive transducer(s) mounted above the level of the contents, towards the surface of the contents. This pulse is reflected off the surface and the reflected or echo signals are received by the transducer in its receive mode, for subsequent analysis. The time interval between the incident pulse being transmitted and the echo pulse being received is directly proportional to the distance between the transducer and the contents surface. Thus, the accuracy of the level measurement is critically dependent on the measurement of this time interval.

A typical example of a device of this type can be understood with reference to FIGS. 1 to 3. An ultrasound level measurement device 10 is mounted above the surface 11 of a fluid 12 contained in a tank 13. As shown in FIG. 2, pulses of acoustic energy are transmitted from transducer crystal 15 towards the surface 11, typically in 1 sec cycles. These pulses are reflected off the surface 11 and returned to the transducer 15. As is well known, the interval between the time of transmission and the time of receipt is directly proportional to the spacing between the transducer crystal 15 and the surface 11.

In the example shown in FIG. 2, the transmit pulses are generated by electronically switching a reservoir capacitor 17 using a microprocessor 18. The output voltage from the capacitor 17 is then increased using a step-up transformer 20 so that it is at a level suitable to drive the transducer crystal 15. On the receive side, the echo signals are received into an amplifier 22 via a pair of protection diodes (not shown) whose function is to satisfy intrinsic safety requirements by limiting the passage of energy from the transducer crystal to the electronic circuit. In order to compensate for the fact that the sound waves passing between the transducer 15 and the surface 11 will be attenuated by the characteristics of the medium between the surface 11 and the transducer 15, the received signal is subjected to a time-variable gain step at 23. Thereafter the signal is filtered and, in this particular example, the peak of the transmit pulse envelope determined and a threshold applied thereto so that spurious or unwanted echoes can be eliminated from further consideration. The accuracy of this type of device is reliant on consistently detecting the same part of the received echo by setting a threshold at, say, a quarter of the amplitude of the echo size. It follows that any change in the shape of the echo waveform will lead to an inaccuracy in measurement.

A problem that arises with the device described above is that, when the level 11 is close to the transducer 15, the energy of the reflected pulse is high and has been known to saturate the echo processing circuit resulting in incorrect measurement of the echo size and consequential incorrect setting of the echo detection threshold. This, in turn, reduces the accuracy of the time measurement.

The saturation is typically exhibited when the input protection diodes clip the waveform so that it adopts the shape as shown in FIG. 3B as opposed to the desired shape shown in FIG. 3A.

It is an object of the invention to provide a method and/or a device which will address the aforementioned problem; or which will at least provide a novel and useful choice.

SUMMARY OF THE INVENTION

Accordingly, in one aspect, the invention provides a method of determining the level of a material surface in a confined space, from a position above said surface, using an ultrasound transducer positioned above said surface, said method including the steps of:

causing said transducer to transmit pulses of ultrasound toward said surface;

receiving echo signals arising from said pulses being reflected from said surface; and processing said echo signals to determine the distance from said transducer to said surface, said method being characterised in that energy applied to the creation of said pulses is reduced when the distance between said transducer and said surface is less than a defined distance and the amplitudes of said echo signals exceed a pre-defined amplitude.

Preferably said energy is reduced by reducing the amplitudes of the transmitted pulses.

Preferably the energy applied to the creation of said pulses is reduced in a stepwise manner as said surface moves from said defined distance towards said transducer.

Preferably a reduction in said energy is reversed if the amplitudes of said echo signals are less than said pre-defined amplitude.

Preferably said ultrasound transducer is driven from a reservoir capacitor, said method including varying the charging time of said capacitor to control the amplitude of the transmitted pulses.

In a second aspect the invention provides apparatus for determining the level of a material surface in a confined space, from a position above said surface, said apparatus including:

an ultrasound transducer positionable above said surface, a transmit circuit operable to cause said transducer to transmit pulses of ultrasound toward said surface;

a receive circuit operable to receive echo signals arising from said pulses being reflected from said surface; and a processing circuit operable to process said echo signals to determine the distance from said transducer to said surface, said apparatus being characterised in that said transmit circuit is configured to apply less energy to the creation of said pulses when the distance between said transducer and said surface is less than a defined distance and the amplitudes of said echo signals exceed a pre-defined amplitude.

Preferably said transmit circuit under the command of said processing circuit is further operable to reduce said energy by reducing the amplitudes of the transmitted pulses.

Preferably said processing circuit is further operable to vary said pre-defined amplitude dependent on the distance between said surface and said transducer.

Preferably said transmit circuit under the command of said processing circuit is further operable to reverse a reduction in said energy if the amplitudes of said echo signals are less than said pre-defined amplitude.

Preferably said transmit circuit includes a reservoir capacitor operable to drive said transducer and means to vary the charging time of said capacitor.

Many variations in the way the invention may be performed will present themselves to those skilled in the art, upon reading the following description. The description should not be regarded as limiting but rather as an illustration, only, of one manner of performing the invention. Where appropriate any element or component should be taken as including any or all equivalents thereof whether or not specifically mentioned.

BRIEF DESCRIPTION OF THE DRAWINGS

One preferred method of, and apparatus for, reducing the present invention to practice will now be described with reference to the accompanying drawings in which.

DETAILED DESCRIPTION OF WORKING EMBODIMENT

Figure 1:
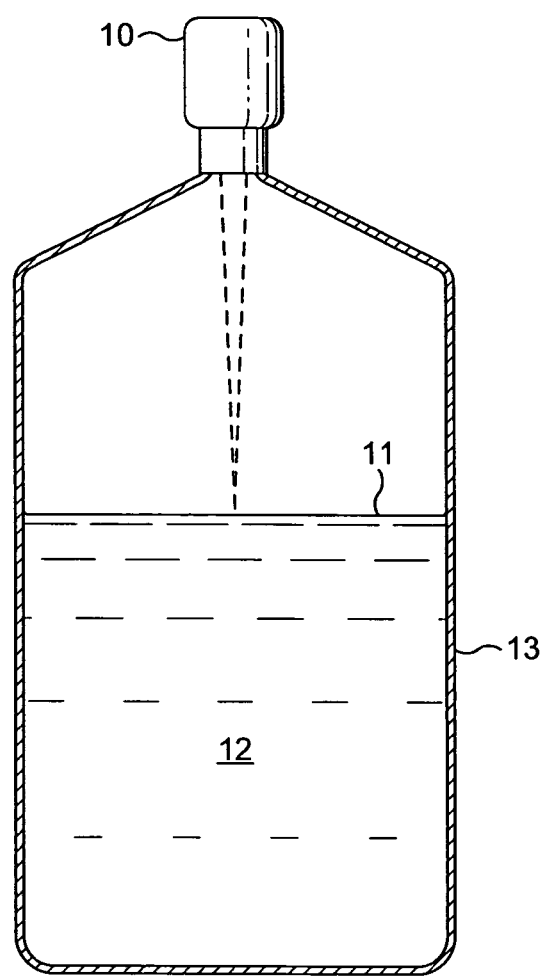
FIG. 1: shows a schematic elevation illustrating the use of ultrasound-based apparatus to measure the level of a fluid in a tank.
Figure 2:
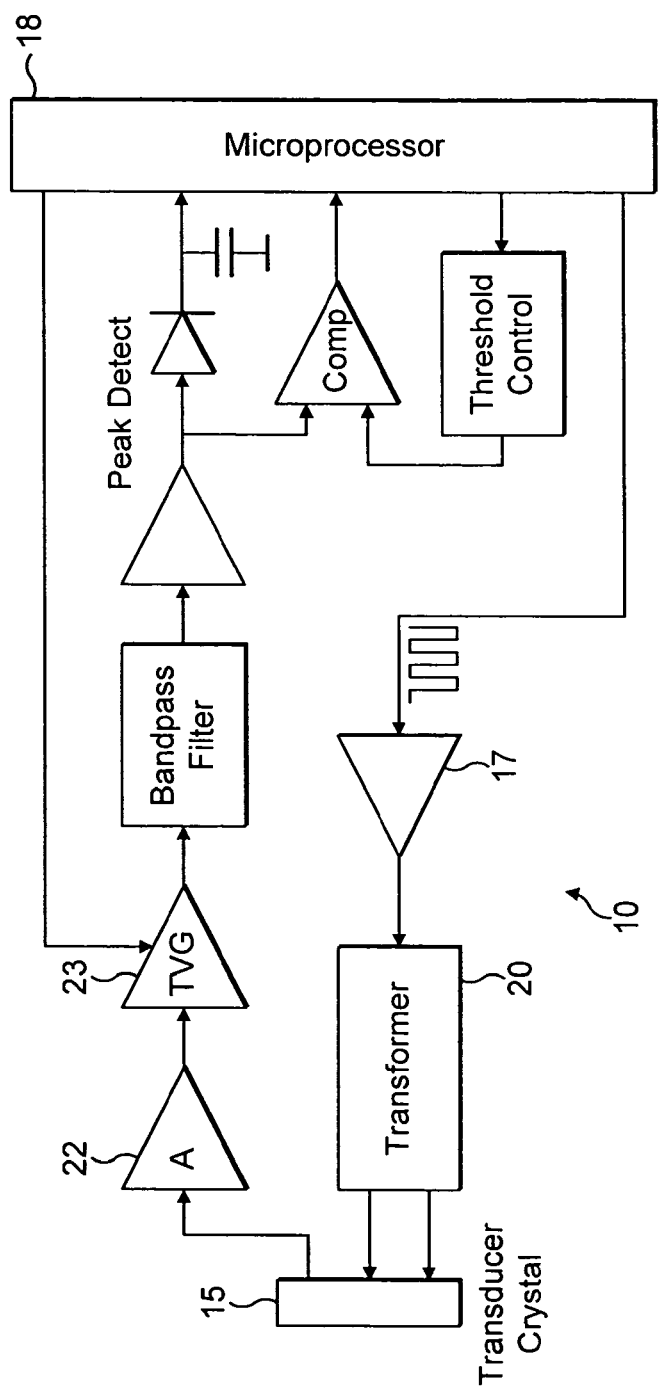
FIG. 2: shows a known circuit diagram used in an ultrasound level measurement apparatus
Figure 3A:
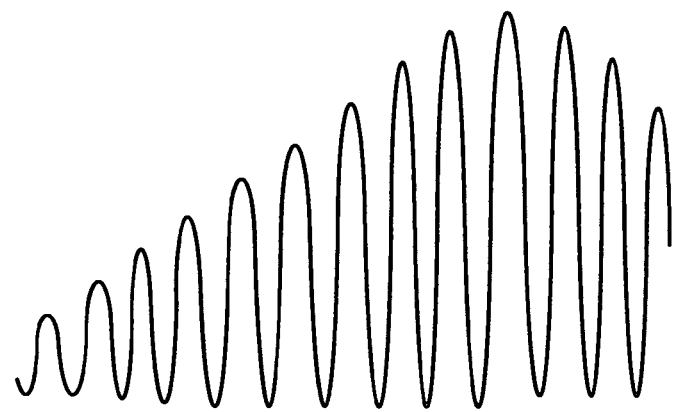
FIG. 3A: shows a desired pulse envelope for a reflected signal.
Figure 3B:
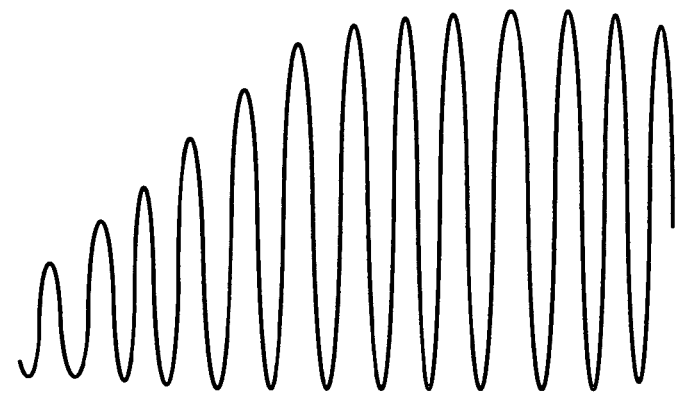
FIG. 3B: shows a pulse envelope which can arise when the fluid level is close to the transducer

The invention provides a method of overcoming the problem caused by saturation of components of the receive circuit in ultrasound level measurement apparatus of the type shown in FIG. 2. Typically the components referred to are a pair of protector diodes which are incorporated to impart intrinsic safety to the apparatus by limiting the energy transfer from the transducer crystal to the electronic circuit. However, other components, including the inputs and outputs of amplifiers 22 and 23 in FIG. 2, may also become overloaded.

Given the typical speed of sound encountered in applications of this type, it is assumed that any echo received in a defined time period following transmission has the potential to saturate elements of the receive circuit, and the inventive method is to be applied. For the purposes of this description, apparatus having a typical cycle time of 1 sec is described and it is assumed that any echo received within 6 ms following transmission has the potential to cause saturation, and thus provide an inaccurate level indication. In this particular example this equates to a distance of 100 cm between the surface and the transducer.

If the first echo reaches the transducer in less than 6 ms following transmission, and if the amplitude of the received echo exceeds a limit which is dependent upon the distance between the surface 11 and the transducer 10, then the transmit power is reduced. The earlier the echo is received, the lower is the limit and the greater the power reduction. Empirical testing has indicated the reductions indicated in Table 1 should be applied if saturation is to be avoided.

TABLE 1

| Optimum Target Echo Size | | | |
| --- | --- | --- | --- |
| Distance to Target (cm) | Time to Target (ms) | Optimum Max Echo Size (%) | Nominal Optimum Recharge Duration (ms) |
| 30 | 1.8 | 46 | 200 |
| 40 | 2.4 | 55 | 300 |
| 50 | 3.0 | 64 | 400 |
| 60 | 3.6 | 73 | 500 |
| 70 | 4.2 | 82 | 600 |
| 80 | 4.8 | 89 | 700 |
| 90 | 5.4 | 95 | 800 |
| 100 | 6.0 | 100 | 900 |

As can be seen, the transmit power is increased in a stepwise manner up to the limit at which the apparatus can be operated at full power without the risk of circuit saturation occurring.

As an illustration of this, if an echo signal is received after 4.8 ms, the transmit power is reduced only if the received echo amplitude exceeds 89% of the amplitude of the largest echo signal expected when the level is more than 100 cm from the transducer.

The transmit energy is preferably reduced by reducing the amplitude of the transmitted pulses and whilst a number of different techniques could be employed to reduce transmit power, in apparatus of the type shown in FIG. 2, it is convenient to achieve power variation by varying the recharge time of the reservoir capacitor. A particular advantage of employing this technique is that it can be implemented in software. The hardware can remain unchanged which has a number of benefits. For example, changing the circuit so that the input no longer saturates with close echoes would require an increase in gain in later stages of the echo processing circuit. This, in turn, would likely increase noise in the system, thereby reducing sensitivity at longer ranges.

Other methods may vary the number of pulses in the transmitted waveform but such a technique changes the profile of the leading edge of the waveform, thereby introducing an error in the echo time measurement.

Further, the invention as described obviates the need for additional intrinsic safety protection which would be required if the reservoir capacitor voltage were to be fed to the microprocessor.

The nominal recharge durations required to achieve the desired power reductions are indicated in the last column in Table 1. These recharge durations may conveniently be achieved by programming the microprocessor to initiate the onset of recharging at varying times in the routine cycle, the shorter the required recharge duration, the later recharging is initiated. Alternatively, charging may be initiated at a common time and turned off at varying times.

As a consequence, the echo signal is the same shape but smaller and, being unclipped may be subjected to peak detection and threshold setting in the conventional manner with the result that accurate levels down to 30 cm spacing of the transducer from the fluid surface can be achieved.

Figure 4:
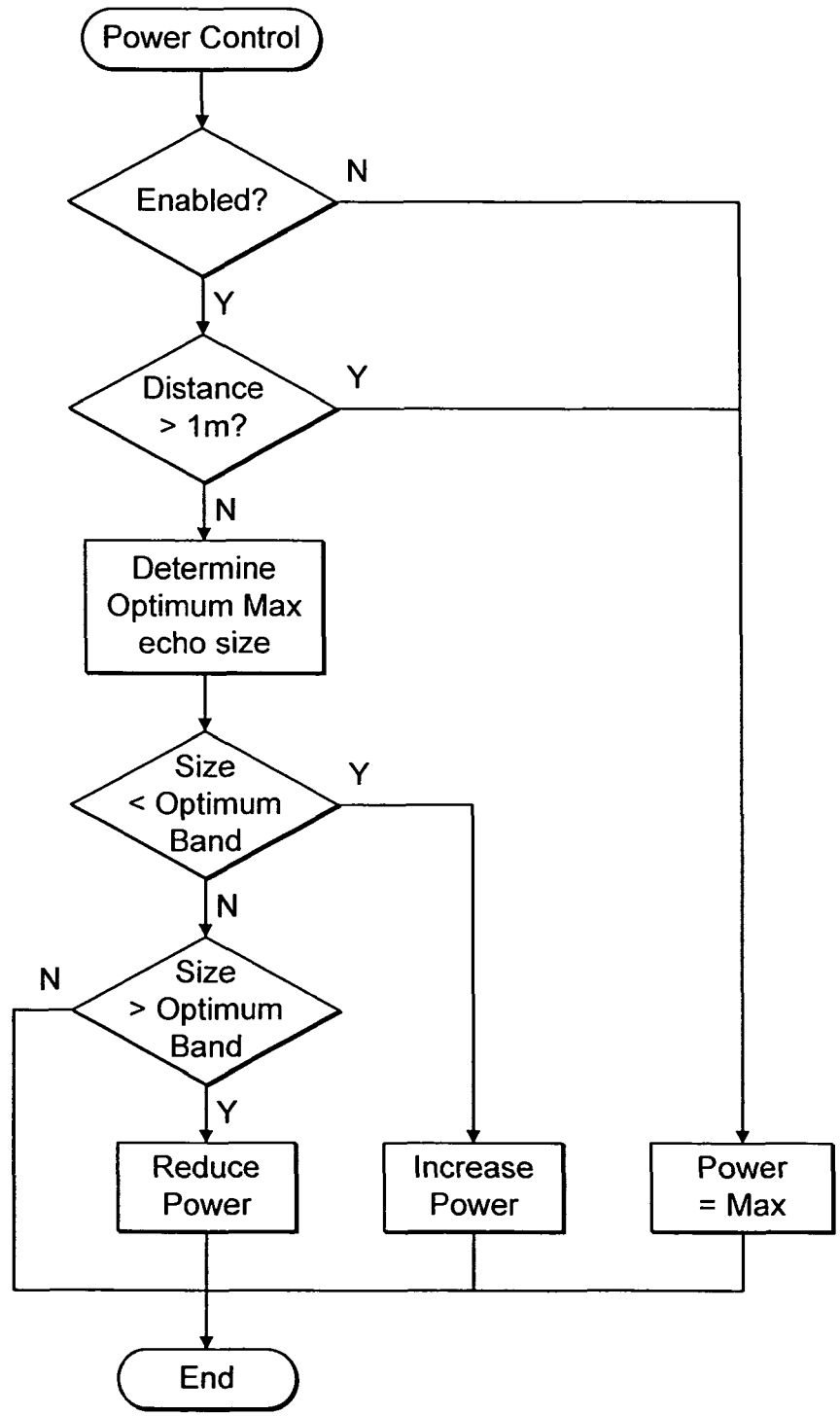
FIG. 4: shows a flowchart of the routine followed to implement the invention.

FIG. 4 shows a flowchart of one exemplary routine followed to determine and then set the appropriate recharge time, and thus power setting, to avoid circuit saturation. Assuming the power control function is enabled, the first step is to determine if power adjustment is to be applied. This is achieved by noting the time of an incoming pulse and, if it arrives in less than 6 ms, the distance to the surface is assumed to be less than 100 cm.

Depending on the time of receipt of the echo signal, an optimum maximum echo size is determined from Table 1. The next step is to compare the amplitude of the incoming echo signal with the optimum maximum echo amplitude. If the amplitude of the incoming echo signal is within a band below the optimum maximum echo size then no adjustment is applied. If the amplitude of the incoming echo signal exceeds the optimum maximum echo size, then power reduction is applied. If, however, the amplitude of the incoming echo signal is less than a band below the optimum maximum echo size, then a power reduction already applied, is reversed.

As is evident from the preceding description, in applying the routine illustrated in FIG. 4, a band is applied below the optimum echo sizes to allow hysteresis to be applied for improved stability. Further, an averaged echo size, derived over (say) five cycles, is compared with the optimum maximum value.

If adjustment to the power is required then, as described above, this is effected by altering the re-charge duration of the reservoir capacitor 17.

Figure 5A:
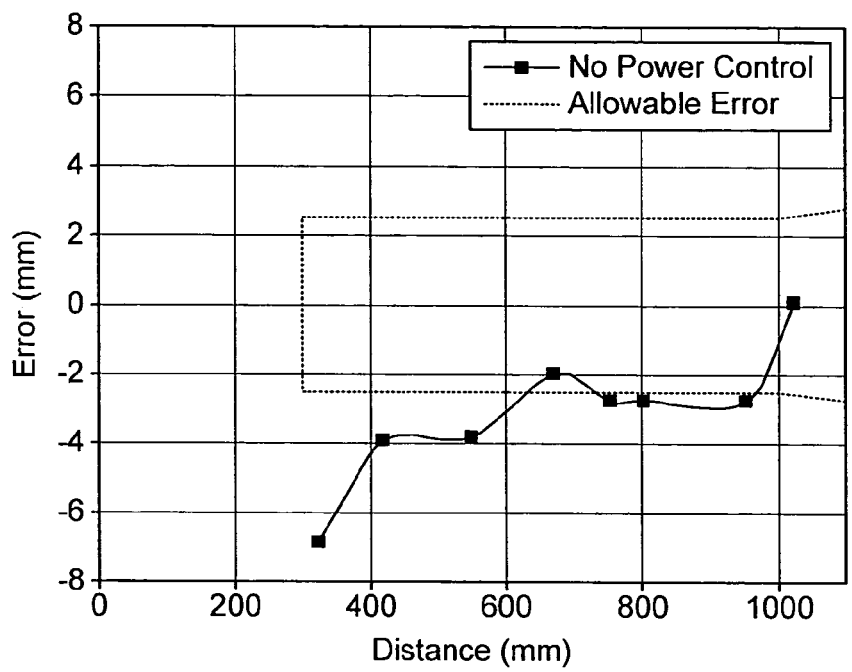
FIGS. 5A and 5B: show error recordings without and with, respectively, applying the invention.
Figure 5B:
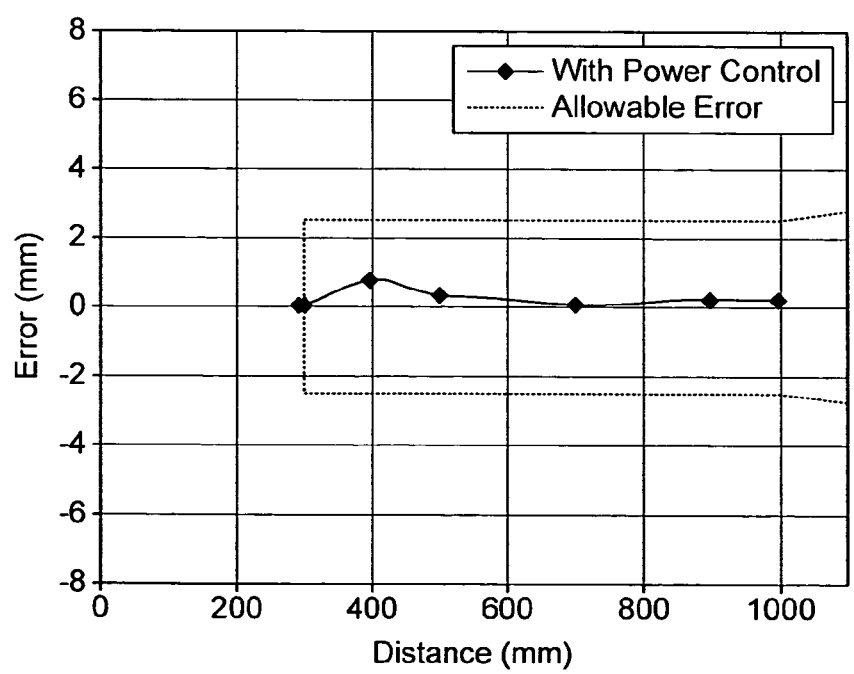

Referring now to FIGS. 5A and 5B, the former illustrates measured errors when a device of the type shown in FIG. 2 is operated at full power all the time. As can be seen in FIG. 5A there is significant error outside the allowable envelope. FIG. 5B illustrates that the use of the invention eliminates unacceptable error right down to the minimum of the blanking distance.

It will thus be appreciated that the present invention provides an effective means of enhancing the accuracy of ultrasound level measuring apparatus and has the particular benefit that it may be applied without any change to the electronic circuit design.

The invention claimed is:

1. A method of determining the level of a material surface in a confined space, from a position above said surface, using an ultrasound transducer positioned above said surface, said method including the steps of:
    causing said transducer to transmit pulses of ultrasound toward said surface;
    receiving echo signals arising from said pulses being reflected from said surface; and
    processing said echo signals to determine the distance from said transducer to said surface,
    said method being characterized in that energy applied to the creation of said pulses is reduced by reducing the amplitudes of the transmitted pulses when the distance between said transducer and said surface is less than a defined distance and the amplitudes of said echo signals exceed a pre-defined amplitude.

2. A method as claimed in claim 1 wherein the energy applied to the creation of said pulses is reduced in a stepwise manner as said surface moves from said defined distance towards said transducer.

3. A method as claimed in claim 1 wherein a reduction in said energy is reversed if the amplitudes of said echo signals are less than said pre-defined amplitude.

4. A method as claimed in claim 1 wherein said ultrasound transducer is driven from a reservoir capacitor, said method including varying the charging time of said capacitor to control the amplitude of the transmitted pulses.

5. Apparatus for determining the level of a material surface in a confined space, from a position above said surface, said apparatus including:
    an ultrasound transducer positionable above said surface,
    a transmit circuit operable to cause said transducer to transmit pulses of ultrasound toward said surface;
    a receive circuit operable to receive echo signals arising from said pulses being reflected from said surface; and
    a processing circuit operable to process said echo signals to determine the distance from said transducer to said surface,
    said apparatus being characterized in that said transmit circuit under the command of said processing circuit is configured to apply less energy to the creation of said pulses by reducing the amplitudes of the transmitted pulses when the distance between said transducer and said surface is less than a defined distance and the amplitudes of said echo signals exceed a pre-defined amplitude.

6. Apparatus as claimed in claim 5 wherein said processing circuit is further operable to vary said pre-defined amplitude dependent on the distance between said surface and said transducer.

7. Apparatus as claimed in claim 5 wherein said transmit circuit under the command of said processing circuit is further operable to reverse a reduction in said energy if the amplitudes of said echo signals are less than said pre-defined limit.

8. Apparatus as claimed in claim 5 wherein said transmit circuit includes a reservoir capacitor operable to drive said transducer and means to vary the charging time of said capacitor.

* * * * *

UNITED STATES PATENT AND TRADEMARK OFFICE
CERTIFICATE OF CORRECTION

PATENT NO.         : 8,464,583 B2
APPLICATION NO.    : 12/531121
DATED              : June 18, 2013
INVENTOR(S)        : Sears et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this
Eighth Day of September, 2015

Michelle K. Lee
*Director of the United States Patent and Trademark Office*